Patented May 11, 1954

2,678,314

UNITED STATES PATENT OFFICE 2,678,314

8-HYDROXY QUINOLINE AND METAL SALTS THEREOF

George E. Taylor, St. Louis, Mo., assignor to Monsanto Chemical Company, St. Louis, Mo., a corporation of Delaware No Drawing. Application December 4, 1950, Serial No. 199,153

4 Claims. (Cl. 260—270)

This invention relates to 8-hydroxy quinoline and metal salts thereof. More particularly it relates to an improved method of making 8-hydroxy quinoline and metal salts thereof. Still more particularly it relates to a method of making the copper salt of 8-hydroxy quinoline of a quality which is especially suitable for the treatment of textiles.

8-hydroxy quinoline is of considerable value in industry as an intermediate material in the manufacture of various chemicals, as a fungicide and for other purposes. The metal salt derivatives of 8-hydroxy quinoline, particularly the copper salt, are well known fungicides and are usually obtained by a precipitation operation involving the addition of an inorganic metal salt precipitating agent to a solution of 8-hydroxy quinoline. Ordinarily in commercial practice 8-hydroxy quinoline is prepared by a Skraup synthesis or by the caustic fusion of quinoline-8-sulfonic acid. While the aforesaid methods of preparing 8-hydroxy quinoline and its metal salts are widely used they have several disadvantages, one of which being the purity of the final product.

In the Skraup synthesis for making 8-hydroxy quinoline usually a mixture containing approximately 3 mols of o-amino phenol and approximately 2 mols of o-nitro phenol is heated with at least 3 mols of glycerine in the presence of at least 3 mols of sulfuric acid, however, other ratios of reactants have been and still are employed in industry. The resultant liquors obtained upon completion of the digestion period are strongly acidic and the crude mixture so obtained is usually diluted with water and adjusted to a pH not higher than 4.1 by the incorporation of caustic or similar alkaline material in order to retain the 8-hydroxy quinoline so produced in solution. Thereupon the undissolved tarry by-products are filtered off. In order to isolate 8-hydroxy quinoline a sufficient quantity of caustic or similar alkaline material is added to the filtrate to raise the pH above 4.1, whereby, 8-hydroxy quinoline precipitates and is filtered off and dried. In the preparation of a metal salt derivative an inorganic metal salt precipitating agent is added to the filtrate, obtained upon removal of the undissolved tarry by-products of the Skraup synthesis, to precipitate the 8-hydroxy quinoline in the form of the metal quinolinolate. The metal quinolinolate is then separated by conventional methods.

In the caustic fusion process for making 8-hydroxy quinoline the quinoline-8-sulfonic acid reactant is prepared by sulfonating quinoline which in turn is prepared by a Skraup synthesis essentially consisting of the heating of a mixture of aniline, nitrophenol, glycerine and sulfuric acid in a molar ratio of approximately 3:2:3:3. The resultant liquors obtained subsequent to the caustic fusion of quinoline-8-sulfonic acid are usually strongly basic and contain substantial quantities of by-products. Thereupon there is added a mineral acid, usually sulfuric acid, to the crude reaction liquors in a quantity sufficient to reduce the pH below 4.1. The solution so obtained is filtered in order to remove the undissolved by-products of the overall synthesis. In those instances wherein 8-hydroxy quinoline is desired the pH of the filtrate is raised to above 4.1, whereby 8-hydroxy quinoline precipitates and is filtered off and dried. In those instances wherein a metal salt of 8-hydroxy quinoline is desired there is incorporated in the filtrate, obtained upon removal of the insoluble by-products of the overall synthesis, an inorganic metal salt precipitating agent and the quinolinolate separated by conventional methods.

8-hydroxy quinoline and its metal salt derivatives resulting from either of the above and similar processes upon filtering off and drying are impure. They contain a substantial quantity of caustic soluble tarry by-products and are usually characterized by a dark discoloration. As a result they have been considered unsuitable for many industrial applications, as for example, in the treatment of the skin and in the treatment of textiles. The steps heretofore taken to remove the caustic soluble tar-like substances from 8-hydroxy quinoline or the metal salt derivatives obtained therefrom are difficult, expensive and time consuming.

In accordance with this invention it has been found that by adding to a solution of crude or impure 8-hydroxy quinoline possessing a pH of 3.8–4.1, such as that obtained from the alkali treated reaction liquors of the Skraup synthesis for making 8-hydroxy quinoline or that obtained from the mineral acid treated reaction liquors of the caustic fusion of quinoline-8-sulfonic acid, a water-soluble copper salt in an amount sufficient to reduce the pH to below about 3.7 and filtering off the insolubilized caustic-soluble tar-like substances as a copper-tar complex a solution of 8-hydroxy quinoline is obtained from which 8-hydroxy quinoline may be isolated and/or its metal salt derivatives prepared therefrom with a high degree of purity. The copper-tar complex so formed upon the addition of a water-soluble copper salt, such as copper sulfate, is brown in color and is insoluble in solutions having a pH of above about 1.5.

In its preferred aspects in the preparation of 8-hydroxy quinoline the invention embodies the addition of copper sulfate to a solution of crude or impure 8-hydroxy quinoline, which possesses a pT of 3.8–4.1, in an amount sufficient to reduce the pH to about 3.7, filtering off the copper-tar complex so formed, raising the pH of the filtrate to 4.1–7.0 by incorporating caustic therein and thereafter separating the precipitated 8-hydroxy quinoline. While an increase in pH to 4.1–7.0 is satisfactory, an increase to 6.0–7.0 is preferable. The amount of copper sulfate required to reduce the pH from 3.8–4.1 to about 3.7 will vary in each case, however, it has been found expedient to add 0.01–0.04 mols of copper sulfate per mol of 8-hydroxy quinoline present in the solution. In most instances it has been found that such an addition does not lower the pH appreciably below 3.7 and is usually in slight excess of that necessary to precipitate all the residual tars as the copper-tar complex. The excess of precipitating agent is removed as the copper salt of 8-hydroxy quinoline along with the copper-tar complex.

In its preferred aspects in the preparation of the copper salt of 8-hydroxy quinoline the invention embodies the addition of copper sulfate to a solution of crude or impure 8-hydroxy quinoline, which possesses a pH of 3.8–4.1, in an amount sufficient to reduce the pH to about 3.7, filtering off the copper-tar complex so formed, adding to the filtrate at least the theoretical quantity of copper sulfate (e. g. 100%–115% of theory) required to react with the residual 8-hydroxy quinoline, raising the pH to 3.0–3.5 by the incorporation of caustic or similar alkaline material, and separating the precipitated light green copper salt of 8-hydroxy quinoline.

While the copper salt of 8-hydroxy quinoline is insoluble at pH's above 2.8 the amount of the copper salt of 8-hydroxy quinoline produced in lowering the pH from 3.8–4.1 to 3.7–2.8 by the addition of copper sulfate is very small and its loss via occlusion with the precipitated copper-tar complex is negligible.

In another aspect in the preparation of the copper salt of 8-hydroxy quinoline the invention embodies the reducing of the pH of the solution of crude or impure 8-hydroxy quinoline from 3.8–4.1 to 1.5–3.7 by the addition of copper sulfate. In reducing the pH below 2.8 it has been found expedient to add a small amount of sulfuric acid in conjunction with the copper sulfate. Thereupon the undesirable copper-tar complex, is filtered off and to the filtrate is added at least the theoretical amount of copper sulfate required to react with the residual 8-hydroxy quinoline. The pH is then raised to 3.0–3.5 by incorporating an alkaline material in the solution and the precipitated light green copper salt of 8-hydroxy quinoline separated. While a reduction in pH to 1.5–3.7 by the addition of copper sulfate is satisfactory, it is more desirable to reduce the pH to 1.5–2.8 and preferably to 1.5–2.0.

In another aspect in the preparation of the copper salt of 8-hydroxy quinoline the invention embodies the addition of at least the theoretical quantity, and preferably 105–115% of the theoretical quantity, of a water-soluble copper salt to the caustic treated reaction liquors of the Skraup synthesis for making 8-hydroxy quinoline or to the mineral acid treated liquors resulting from the preparation of 8-hydroxy quinoline by the caustic fusion of quinoline-8-sulfonic acid or to any other solutions of impure 8-hydroxy quinoline which possess a pH of 3.8–4.1. Usually such amounts of a water-soluble copper salt, as for example, copper sulfate, are sufficient to reduce the pH below 1.5. Thus to insolubilize the copper-tar complex sufficient caustic or similar alkaline material is added to raise the pH of the solution to 1.5–2.8, but preferably to 1.5–2.0. Thereafter the filtrate, obtained upon removing the copper-tar complex, is adjusted to a pH of 3.0–3.5 by the addition of an alkaline material such as caustic and the precipitated light green copper salt of 8-hydroxy quinoline separated.

As exemplary of the invention the following is illustrative and in no manner is to be construed as limitative thereof.

*Example I*

To a Skraup reaction vessel is added and intimately mixed approximately 6.86 lb.-mols of 88% glycerine, approximately 3.6 lb.-mols of o-aminophenol, and approximately 2.32 lb.-mols of o-nitrophenol. The mix so formed is heated to 65°–70° C. and thereto is added with constant agitation approximately 7.96 lb.-mols of 66° Beaumé sulfuric acid over a period of one hour. During the acid addition the temperature rises gradually to about 150° C. Upon completion of the acid addition the temperature is maintained at 150°–155° C. for about five hours. Thereupon the reaction mix is steam distilled free of o-nitrophenol and the residue diluted with water to 250 gallons. While maintaining the temperature of the mix below about 40° C. approximately 11.6 lb.-mols of caustic in the form of a 15% aqueous solution is added with constant agitation. The pH of the resultant solution is about 3.95. Upon filtering off the insoluble by-products the filtrate is heated to 60° C. and thereto is added approximately 20 gallons of a solution containing approximately 1 lb.-mol of copper sulfate per 300 gallons of solution. The pH of the solution so obtained is reduced to approximately 3.7. Thereupon the brown copper-tar complex so formed is filtered off, and a clear filtrate is obtained.

*Example II*

To 50% by weight the filtrate of Example I is added 3.75 lb.-mols of caustic in the form of a 15% aqueous solution. The pH is increased to about 7.0. The precipitated 8-hydroxy quinoline is filtered off, washed and dried. A yield of about 100% (based upon o-aminophenol) of 8-hydroxy quinoline of a high quality suitable for treatment of human skin is obtained.

Employing the same steps of Examples I and II exclusive of the addition of copper sulfate for removal of the caustic soluble by-products 8-hydroxy quinoline is obtained possessing a 3°–5° C. lower melting point.

*Example III*

To 50% by weight of the filtrate of Example I is added 290 gallons of a solution containing approximately 1 lb.-mol of copper sulfate per 300 gallons of solution. Thereupon the solution is heated to about 60° C. and the pH of the solution is raised to 3.0–3.2 by the addition of approximately 1.75 lb.-mols of caustic in the form of a 50% aqueous solution. The copper salt of 8-hydroxy quinoline so precipitated is filtered off, washed and dried. A yield of substantially 100%

(based upon o-aminophenol) of copper-8-quinolinolate of high quality is obtained which is particularly suitable for the treatment of light colored textiles.

The copper salt which is obtained employing the same steps of Examples I and III exclusive of the copper sulfate addition for removal of the caustic soluble by-products possesses a dark discoloration and upon application to light colored textiles imparts an undesirable stain.

Employing the same steps of Example III but replacing the copper sulfate with an equivalent weight of zinc sulfate and adjusting the pH of the solution with caustic to 4.5–5.0, filtering off the precipitate and drying same there is obtained a yield of substantially 100% (based upon o-aminophenol) of zinc-8-quinolinolate of high quality.

In a similar manner other metal salts, as for example cadmium, magnesium and ferric salts of 8-hydroxy quinoline, are obtained in purified form by the addition of a suitable metal salt precipitating agent to an acid solution of 8-hydroxy quinoline, which has been treated with a copper salt to remove the residual tars in the manner of this invention, and subsequently adjusting the pH with caustic or similar alkaline material to that pH at which the metal quinolinolate precipitates.

Other water-soluble copper (cupric) salts than copper sulfate are also operable, for example, the nitrate, the chloride, the chromate, the phosphate, the acetate, the oxalate, and the like, however the sulfate is preferred.

Instead of caustic other alkali metal hydroxides can be employed such as potassium hydroxide. Other alkaline materials are also operable, as for example, caustic soda, sodium bicarbonate, potassium carbonate, ammonium hydroxide and the like.

While the invention has been described relative to several specific embodiments it is not so limited and variations and modifications thereof may be made by those skilled in the art without departing from the spirit or scope of the invention.

What is claimed is:

1. In the method of making 8-hydroxy quinoline the step which comprises adding to a solution of impure 8-hydroxy quinoline containing as impurities caustic-soluble tar-like substances and possessing a pH of 3.8–4.1, 0.01–0.04 mols of copper sulfate per mol of 8-hydroxy quinoline and separating the insolubilized caustic-soluble tar-like substances as a copper-tar complex.

2. The method of making the copper salt of 8-hydroxy quinoline which comprises adding to a solution of impure 8-hydroxy quinoline containing as impurities caustic-soluble tar-like substances and possessing a pH of 3.8–4.1 a sufficient quantity of copper sulfate to reduce the pH of the solution to a pH in the range of 1.5–2.8, filtering off the insolubilized caustic-soluble tar-like substances as a copper-tar complex, adding to the filtrate at least the theoretical quantity of copper sulfate required to react with the 8-hydroxy quinoline contained in said filtrate, adjusting the pH of the solution to 3.0–3.5 by the addition of caustic and separating the resultant precipitated copper quinolinolate in purified form.

3. The method of making the copper salt of 8-hydroxy quinoline which comprises adding to a solution of impure 8-hydroxy quinoline containing as impurities caustic-soluble tar-like substances and possessing a pH of 3.8–4.1 at least the theoretical quantity of copper sulfate required to react with the 8-hydroxy quinoline contained therein, adjusting the pH of the solution to 1.5–2.8 by the addition of caustic, filtering off the insolublized caustic-soluble tar-like substances as a copper-tar complex, adding to the filtrate sufficient caustic to adjust the pH to 3.0–3.5, and separating the resultant precipitated copper quinolinolate in purified form.

4. In the method of making 8-hydroxy quinoline the step which comprises adding to a solution of impure 8-hydroxy quinoline containing as impurities caustic-soluble tar-like substances and possessing a pH of 3.8–4.1, obtained by treating the reaction liquors of the Skraup synthesis for making 8-hydroxy quinoline with caustic, 0.01–0.04 mols of copper sulfate per mol of 8-hydroxy quinoline and separating the insolubilized caustic-soluble tar-like substances as a copper-tar complex.

References Cited in the file of this patent

UNITED STATES PATENTS

| Number | Name | Date |
|---|---|---|
| 2,381,863 | Benignus | Aug. 14, 1945 |
| 2,447,234 | Dean | Aug. 17, 1948 |
| 2,487,874 | Huber | Nov. 15, 1949 |

FOREIGN PATENTS

| Number | Country | Date |
|---|---|---|
| 14,976 | Germany | Sept. 10, 1881 |

OTHER REFERENCES

Goto et al., Chem. Abstr., vol. 41 (1947), p. 5412.

Manske et al., Canadian J. Research, vol. 27-F (Sept. 1949), pp. 359–367.